(12) United States Patent
Gillespie et al.

(10) Patent No.: US 10,311,918 B1
(45) Date of Patent: Jun. 4, 2019

(54) SYSTEM, MEDIA, AND METHOD FOR SYNCHRONIZATION OF INDEPENDENT SENSORS AND RECORDING DEVICES

(71) Applicant: Space Projects Ltd., Midland, VA (US)

(72) Inventors: Ernie L. Gillespie, Spotsylvania, VA (US); Scott A. Bass, Midland, VA (US); Gary Gesmundo, Hickory Corners, MI (US)

( * ) Notice: Subject to any disclaimer, the term of this patent is extended or adjusted under 35 U.S.C. 154(b) by 307 days.

(21) Appl. No.: 15/425,444

(22) Filed: Feb. 6, 2017

Related U.S. Application Data

(60) Provisional application No. 62/324,564, filed on Apr. 19, 2016.

(51) Int. Cl.
| | |
|---|---|
| *G11B 27/22* | (2006.01) |
| *H04N 5/77* | (2006.01) |
| *G11B 27/32* | (2006.01) |

(52) U.S. Cl.
CPC .......... *G11B 27/326* (2013.01); *G11B 27/22* (2013.01); *H04N 5/77* (2013.01)

(58) Field of Classification Search
CPC ......... G11B 27/326; G11B 27/22; H04N 5/77
See application file for complete search history.

(56) References Cited

U.S. PATENT DOCUMENTS

| | | | |
|---|---|---|---|
| 4,280,137 A | 7/1981 | Kshida et al. | |
| 5,119,242 A | 6/1992 | Murray | |
| 6,080,063 A * | 6/2000 | Khosla | A63F 13/10 463/42 |
| 6,144,375 A | 11/2000 | Jain et al. | |
| 6,512,884 B1 | 1/2003 | Sawada | |
| 7,057,663 B1 | 6/2006 | Lee | |
| 7,831,555 B2 | 11/2010 | Fernandez | |
| 8,514,896 B2 | 8/2013 | Tapie et al. | |
| 8,718,447 B2 | 5/2014 | Yang et al. | |
| 8,849,432 B2 | 9/2014 | Moorer | |
| 8,924,345 B2 | 12/2014 | Bryan et al. | |
| 2005/0177372 A1 | 8/2005 | Wang et al. | |

(Continued)

OTHER PUBLICATIONS

Cotton et al., Audio Fingerprinting to Identify Multiple Videos of an Event, LabROSA, Dept. of Electrical Engineering, Columbia University, New York, USA.

*Primary Examiner* — Thai Q Tran
*Assistant Examiner* — Jose M Mesa
(74) *Attorney, Agent, or Firm* — Dinsmore & Shohl, LLP; Monika Jaensson; Bryan Walker

(57) ABSTRACT

Systems, methods, and media for synchronization of independent sensors and recording devices are provided. A method includes recording, through a synchronizing sensor, sensor data detected from an event. The method may further output from the synchronizing sensor, the sensor data from the event and a periodic synchronizing signal. The method also generates, from a recorder, recorded event data comprising the periodic synchronizing signal and first additional data recorded from the event. The method outputs the recorded event data from the recorder. The method receives the sensor data from the event and the recorded event data. The method synchronizes according to the periodic synchronizing signal, at the computing device, the recorded event data and the sensor data from the event.

19 Claims, 7 Drawing Sheets

(56) References Cited

U.S. PATENT DOCUMENTS

| | | |
|---|---|---|
| 2005/0232411 A1 | 10/2005 | Srinivasan et al. |
| 2006/0078305 A1 | 4/2006 | Arora et al. |
| 2008/0129872 A1 | 6/2008 | Cooper |
| 2010/0035727 A1 | 2/2010 | Brunner |
| 2012/0275769 A1 | 11/2012 | Yang et al. |
| 2015/0143392 A1 | 5/2015 | Silveira-Filho et al. |
| 2017/0339446 A1* | 11/2017 | Arms .................. H04N 21/231 |

* cited by examiner

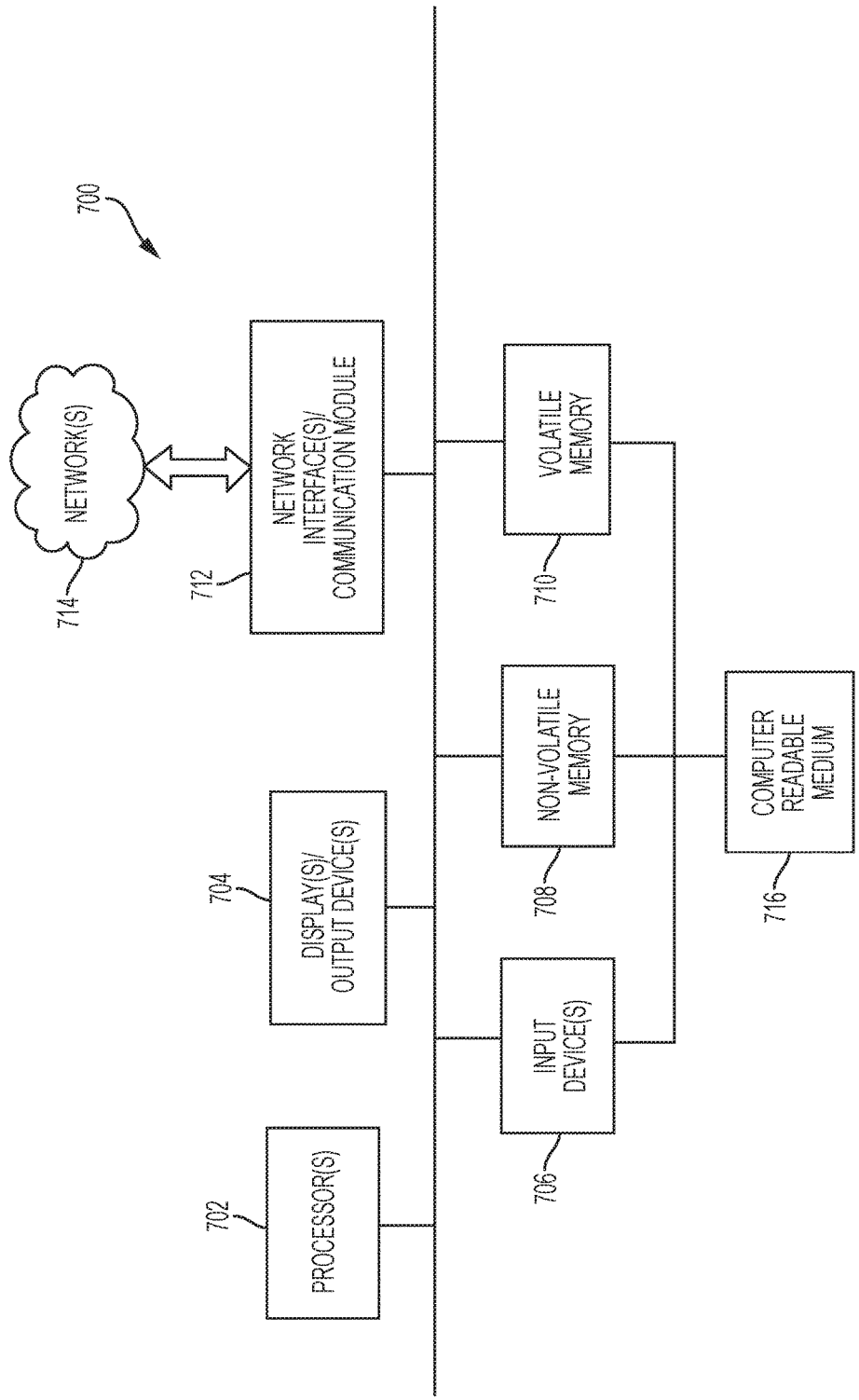

US 10,311,918 B1

SYSTEM, MEDIA, AND METHOD FOR SYNCHRONIZATION OF INDEPENDENT SENSORS AND RECORDING DEVICES

CROSS-REFERENCE TO RELATED APPLICATIONS

This application claims the benefit of U.S. Provisional Application 62/324,564, filed Apr. 19, 2016, which is incorporated by reference in its entirety.

TECHNICAL FIELD

The present application generally relates to data collection and synchronization, such as the synchronization of multiple audio/visual recordings of an event according to separately-recorded data.

BACKGROUND

The proliferation of high-quality, high-speed, low-cost video cameras has greatly expanded the use of audio/video data to record and analyze a broad variety of subject matter. Some applications of this, though, require the collection of supporting data (environmental, motion, biometric, etc.) to obtain a more complete understanding and/or observation of an event. While the collection of supporting data can be performed with stand-alone sensors, data and/or accuracy is lost due to a lack of synchronization with the audio/video recording.

Accordingly, a need exists for systems that provide synchronization between data obtained from recording devices and data obtained from sensors, along with media and methods of use of such systems.

SUMMARY

A system may comprise a synchronizing sensor which may comprise a sensing component configured to record sensor data detected from an event. The synchronizing sensor may further comprise an output component configured to output the sensor data from the event and a periodic synchronizing signal. The system may further comprise a recorder configured to generate recorded event data comprising the periodic synchronizing signal and first additional data recorded from the event. The recorder may be further configured to output the recorded event data. The system may further comprise a computing device comprising a processor and memory coupled to the processor. The computing device may further comprise instructions residing in the memory that upon execution cause the processor to receive the sensor data from the event and the recorded event data and synchronize, according to the periodic synchronizing signal, the recorded event data, and the sensor data from the event.

In another embodiment, a method may comprise recording, through a synchronizing sensor, sensor data detected from an event. The method may further output from the synchronizing sensor, the sensor data from the event and a periodic synchronizing signal. The method may also generate, from a recorder, recorded event data comprising the periodic synchronizing signal and first additional data recorded from the event. The method may further output the recorded event data from the recorder. The method may also further receive, at a computing device, the sensor data from the event and the recorded event data. The method may also synchronize according to the periodic synchronizing signal, at the computing device, the recorded event data, and the sensor data from the event.

In yet another embodiment, a non-transitory computer readable medium embodies computer-executable instructions, that when executed by a processor, cause the processor to record, through a synchronizing sensor, sensor data detected from an event. The processor may also output, from the synchronizing sensor, the sensor data from the event and a periodic synchronizing signal. The processor may further generate, from a recorder, recorded event data comprising the periodic synchronizing signal and first additional data recorded from the event. The processor may also output the recorded event data from the recorder. The processor may receive, at a computing device, the sensor data from the event and the recorded event data. The processor may synchronize according to the periodic synchronizing signal, at the computing device, the recorded event data, and the sensor data from the event.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 is a block diagram illustrating computing hardware utilized in one or more devices, sensors, and/or recorders, according one or more embodiments shown and described herein.

DETAILED DESCRIPTION

Embodiments of the present disclosure are directed to methods, systems, and media for the synchronization of multiple data types from multiple sources. For a given event (or multiple related events), various components may be available to capture different types of data from the event. For example, a recorder may capture footage of an event. At the same time, a sensor interacting with a user may be capturing sensor data. While both types of data may be captured of the same event, not all of it would be synchronized. Manually trying to synchronize various types of data can lead to a lack of complete synchronization, and as well as potential losses of data. Achieving accurate synchronization can provide a more holistic analysis and/or view of one or more events.

Figure 1:
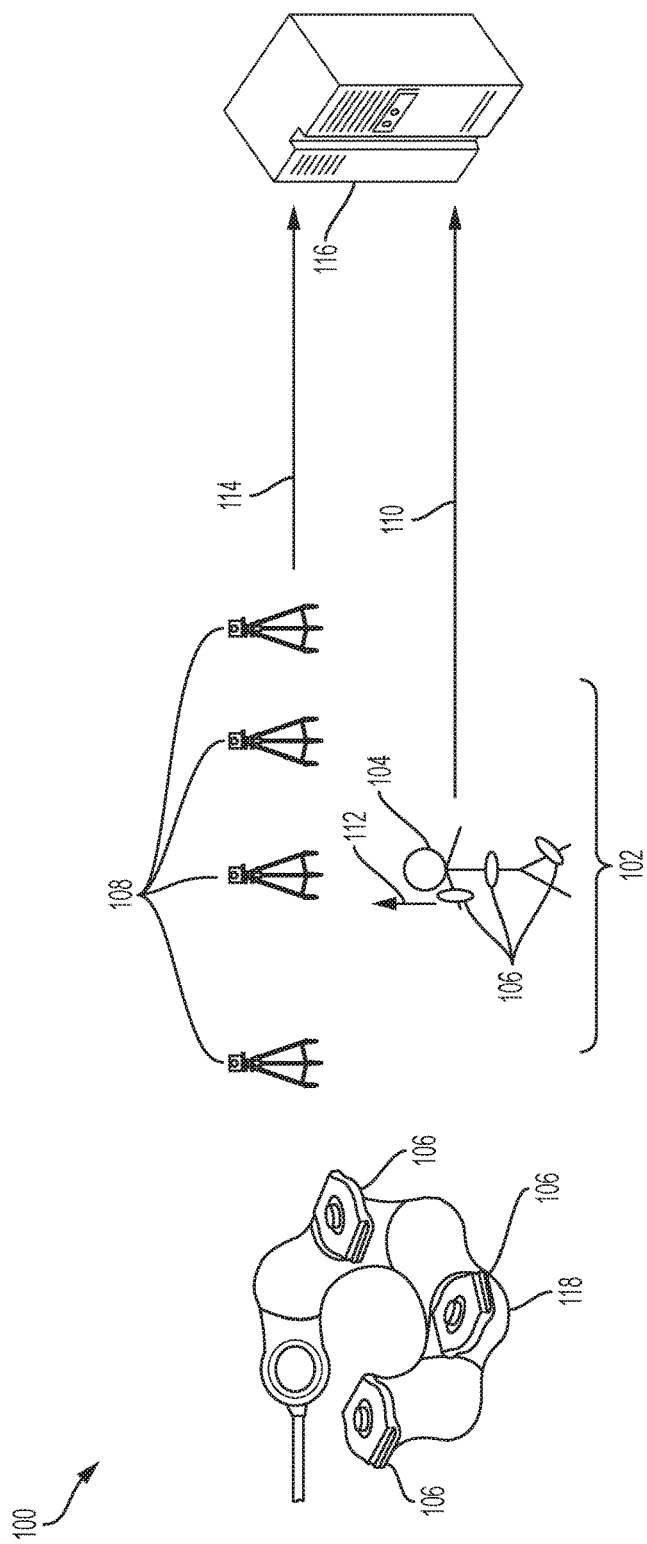
FIG. 1 schematically illustrates an exemplary operating environment featuring recorders, synchronizing sensors, a user, and a computing device, according to one or more embodiments shown and described herein.

Referring now to FIG. 1, a diagram 100 of an event 102 is depicted, through which embodiments of the disclosure can be implemented. An event 102 involving a participant 104 wearing synchronizing sensors 106 is recorded by recorders 108. An event 102 may utilize any suitable distance, location, duration, type, and may have one or more participants 104, one or more synchronizing sensors 106, and/or one or more recorders 108. Other embodiments may feature no participants in an event 102. Some embodiments may feature related events that are close to, or overlap, in terms of distance, location, duration, and/or participant(s) 104. In this embodiment, a participant 104 is depicted as a person, but in other embodiments can be any type of animal, plant, organism, machine, vehicle, aircraft, or anything else from which one or more synchronizing sensors 106 can record sensor data 110. Any number of participants 104 may be present at an event 102, and participant types may vary and/or change within an event 102.

A synchronizing sensor 106 may be any device that can be worn or otherwise attached to a participant 104 to record data through one or more sensing components that sense/measure/record sensor data 110 that may include biometric data (blood pressure, pulse, heart rate, perspiration, temperature, voice, facial-recognition, iris or other types of eye recognition, hand geometry, fingerprint, DNA, dental records, weight, or any other suitable type of biometric data, etc.), video/still images, motion data (accelerometer, GPS, magnetometer, gyroscope, etc.) and/or audio (including ultrasonic sound waves). Any number of synchronizing sensors 106 may be utilized at an event 102, and multiple synchronizing sensors 106 at an event 102 need not be of the same type. Synchronizing sensors 106 may emit synchronizing signals 112 such as, by way of example, audio (of any frequency), energy (radio, microwave, infrared, visible light, ultraviolet, x-ray and gamma ray), electronic output devices (Wi-Fi, radar, laser, etc.), and/or any other suitable type of output capable of being recorded. A synchronizing signal 112 may be periodic, such as a pulse. A synchronizing signal 112 may occur at regular intervals, randomly, or at fluctuating intervals. The duration of each synchronizing signal 112 occurrence may be uniform or vary. The type of a synchronizing signal 112 may be uniform or vary at each occurrence. At least one synchronizing sensor 106 per event 102 emits a synchronizing signal 112, as other synchronizing sensors 106 at an event may not emit their own synchronizing signal 112 (or even have such a capability).

Recorders 108 are depicted here as video cameras, but may be any suitable type of recording device, such as, by way of example, audio recorders, cameras (with or without audio recording), such as digital and/or analog cameras, still cameras, video cameras, thermal imaging cameras, infrared cameras, cameras with a charge-couple display, night-vision cameras, three-dimensional cameras, webcams, and/or audio recorders, etc. At least one recorder 108 is configured per event 102 to record at least one type of synchronizing signal 112 while recording the event 102 to generate recorded event data 114. Any number of recorders 108 may be utilized and may be placed anywhere in relation to one or more events 102. At least one recorder 108 at an event 102 is configured to capture recorded event data 114 that includes at least part of a synchronizing signal 112. In some embodiment each recorder 108 at event 102 captures a synchronizing signal 112 as part of its recorded event data 114. At least one recorder 108 outputs its recorded event data 114, including a synchronizing signal 112, to a computing device 116. In some embodiments, each recorder 108 at an event 102 (or multiple related events) outputs its recorded event data 114 simultaneously. In other embodiments, this may be performed sequentially, based upon when the recorded event data 114 is ready for output, or any other suitable way. In some embodiments, each recorder 108 outputs its own recorded event data 114 individually. A recorder 108 may transfer its own recorded event data 114 to another recorder 108. A recorder 108 may directly transfer (wireless connection, wired connection, etc.) its recorded event data 114 to a computing device 116, or to any number of intermediate destinations, before reaching the computing device 116, which in some embodiments may include a synchronizing sensor 106 configured to receive and output such recorded event data 114.

At least one synchronizing sensor 106 outputs its sensor data 110, to the computing device 116. In some embodiments, each synchronizing sensor 106 at an event 102 (or multiple related events) outputs its sensor data 110 simultaneously. In other embodiments, this may be performed sequentially, based upon when the sensor data 110 is ready for output, or any other suitable way. In some embodiments, each synchronizing sensor 106 outputs its own sensor data 110 individually. A synchronizing sensor 106 may transfer its own sensor data 110 to another synchronizing sensor 106. A synchronizing sensor 106 may directly transfer (wireless connection, wired connection, etc.) its sensor data 110 to the computing device 116, or to any number of intermediate destinations, before reaching the computing device 116, which in some embodiments may include a recorder 108 configured to receive and output such sensor data 110.

The computing device 116 receives sensor data 110 and recorded event data 114, which in some embodiments may be received simultaneously or at different times, and may be received together or as separate pieces of data. Each portion of sensor data 110 and recorded event data 114 may be received directly or indirectly from the respective synchronizing sensors 106 and recorders 108. As discussed in more detail below with respect to FIGS. 5 and 6, the computing device 116 synchronizes sensor data 110 and recorded event data 114. A single computing device 116 is depicted in this embodiment, although any number and/or types of computing devices 116 may be utilized. A computing device 116 may be, for example, a server, client, workstation, portable device, laptop, smartphone, or tablet that is able to synchronize the various types of recorded event data 114 and sensor data 110. The computing device 116 may utilize any suitable communication type, such as TCP/IP, Bluetooth, Zigbee, ethernet, data cable, diskette, optical disk, etc.

A synchronizing sensor station 118 may also be utilized in some embodiments. The synchronizing sensor station 118 may be located within or outside of an event 102, and more than one (or none) may be utilized. In various embodiments, the synchronizing sensor station 118 may be utilized to synchronize and/or charge synchronizing sensors 106. In some embodiments, the synchronizing sensor station 118 may be utilized to configure one or more synchronizing sensors 106 (such as with on-board buttons, a screen, etc.). In some embodiments, a synchronizing sensor 106 may be configured locally at the synchronizing sensor 106 itself, at the synchronizing sensor station 118, and/or remotely, such as at the computing device 116. In some embodiments, a recorder 108 may be configured locally at the recorder 108 itself and/or remotely, such as at the computing device 116.

Figure 2:
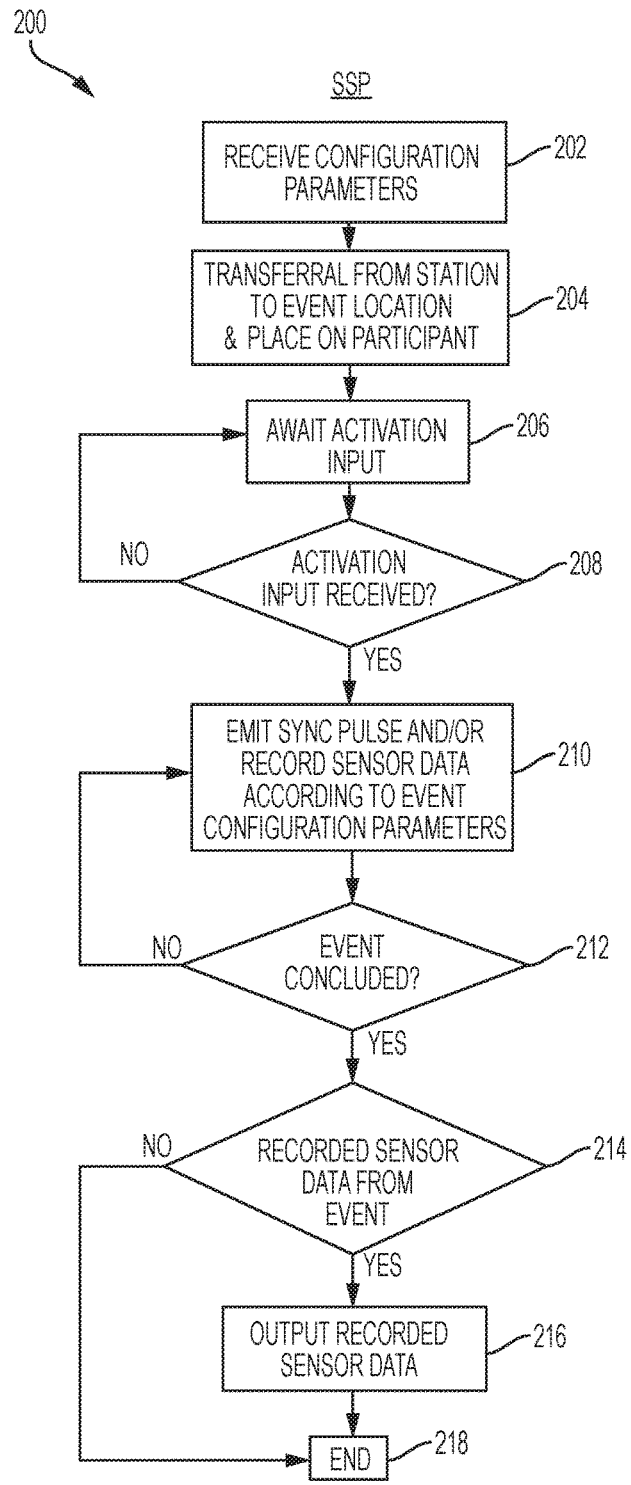
FIG. 2 is a flow chart depicting the operation of a synchronizing sensor, according to one or more embodiments shown and described herein.

Turning now to FIG. 2, a flowchart 200 of the operation of a synchronizing sensor is shown according to various embodiments. At 202, a synchronizing sensor receives configuration parameters while at a synchronizing sensor station. In other embodiments, the synchronizing sensor receives configuration parameters wirelessly, from a wired connection, and/or a connection through any suitable device. Configuration parameters may include, for example, event data (location, duration, etc.), type(s) of sensor data to be recorded, type(s) of synchronizing signal(s), and repeating characteristics of the synchronizing signal(s). In other embodiments, the synchronizing sensor may be already configured, such as through hardwiring. In further embodiments, the synchronizing sensor parameters may be updated at any time, including (for example) in real-time. In other embodiments, a participant wearing a synchronizing sensor can configure it while wearing it.

At 204 the synchronizing sensor is removed from the synchronizing sensor station and placed on a participant for an event. At 206 the synchronizing sensor awaits activation. At 208 the synchronizing sensor checks whether an activation input has been received. In other embodiments synchronizing sensors may be continuously operating and/or recording. In some other embodiments, a synchronizing sensor is activated by the participant wearing it. In other embodiments, the synchronizing sensor is activated by a remote activation signal received from a location that may be within or outside of the event. For example, the activation signal may originate at the computing device that will synchronize the sensor data and the recorded event data, or any other remote device or user. In still other embodiments, a synchronizing sensor may be activated based on satisfying one or more criteria (location, time, motion, etc.). In the depicted embodiment, if no input activation is received (or no activation criterion is met), the sensor continues to await activation at 206.

At 210 the synchronizing sensor has been activated, and begins to emit a synchronizing signal and/or recording sensor event data. As discussed above, the synchronizing signal may be (for example) an inaudible audio signal, based on the configuration parameters received at 202, which may also determine synchronizing signal characteristics such as duration, frequency of occurrence, type of signal, etc. In other embodiments configuration parameters are not utilized. In some embodiments, the synchronizing signal is a regular, periodic pulse. The sensor event data may be any type of data detectable by the synchronizing sensor. At 212, the synchronizing signal continues to be emitted by the synchronizing sensor until the event is concluded, which may be based upon, for example: time, duration, and/or location of a synchronizing sensor, recorder, and/or an event participant, and/or a received signal (from a synchronizing sensor, the computing device, and/or other device). In other embodiments, as discussed above, various configuration parameters may include a termination condition separate from (or in addition to) the event itself. At 214, once the event has concluded, if no sensor data was recorded from the event, the synchronizing sensor completes its operation 218 with respect to the event. If sensor data was recorded, then the sensor data is output at 216, which may entail direct or indirect transmission to the computing device or any other suitable device. The synchronizing sensor then completes its operation 218 with respect to the event and may, for example, be returned to the same or a different synchronizing sensor station 118.

Figure 3:
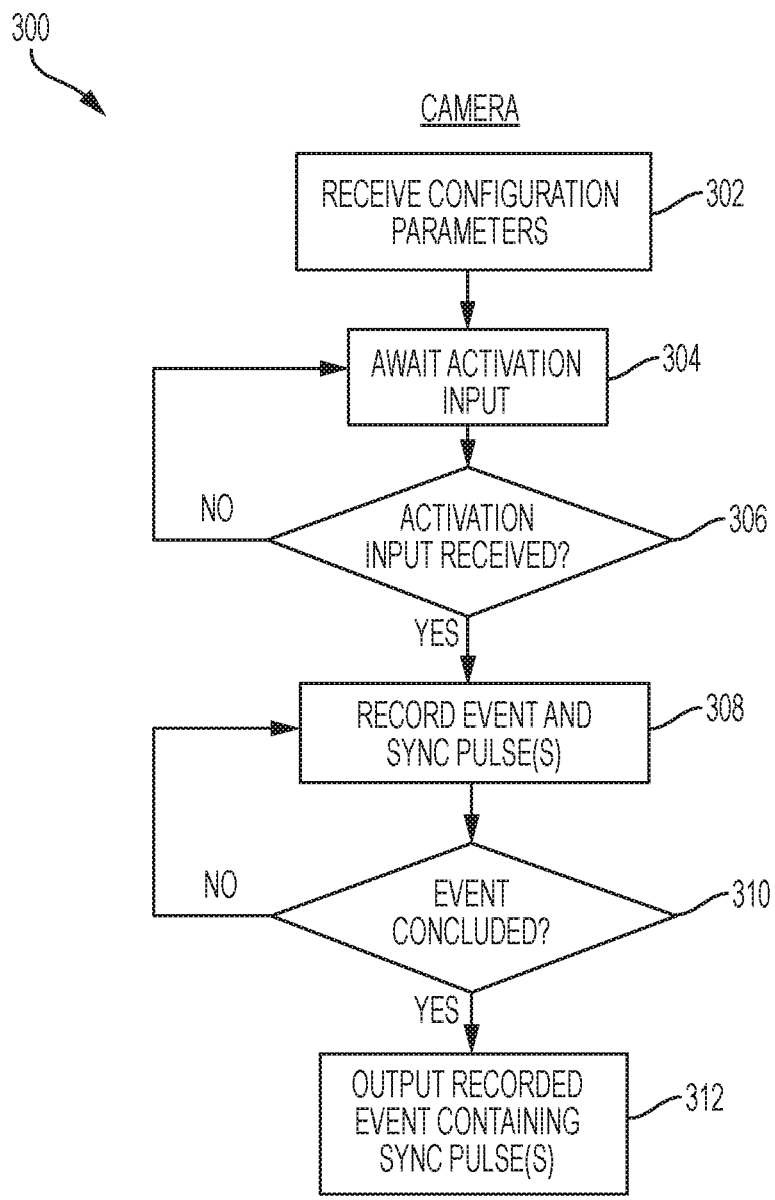
FIG. 3 is a flow chart depicting the operation of a recorder, according to one or more embodiments shown and described herein.

Turning now to FIG. 3, a flowchart 300 of the operation of a recorder is shown according to various embodiments. At 302, a recorder receives configuration parameters. Configuration parameters may include, for example, event data (location, duration, etc.), recorder parameters (recorder location, operating status, storage space remaining, etc.), and/or type(s) of data to be recorded (video, audio, etc.).

At 304 the recorder awaits an activation input, such as in a standby mode. In other embodiments recorders may be continuously operating and/or recording. At 306 the recorder checks whether an activation input has been received. In other embodiments recorders may be continuously operating and/or recording. In some embodiments, the recorder is activated by an event participant or an event observer. In other embodiments, the recorder is activated by a remote activation signal received from a location that may be within or outside of the event. For example, the activation signal may originate at the computing device that will synchronize the sensor data and the recorded event data, or any other remote device or user. In still other embodiments, a recorder may be activated based on satisfying one or more criteria (location, time, motion, etc.). Other embodiments may provide for activation of the recorder based upon receipt of a synchronizing signal from a synchronizing sensor. If no input activation is received (or no activation criterion is met), the recorder continues to await activation at 304.

At 308 the recorder has received an activation input and begins recording the event (e.g., recording data representing the event such as audio and/or video data) and/or a synchronizing signal. At 310, the recorder continues to record the event and (for example) a periodic synchronizing signal until the event concludes. The conclusion of the event may be based upon, for example, time, duration, and/or location of a synchronizing sensor, recorder, and/or an event participant, and/or a received signal (from a synchronizing sensor, the computing device, and/or other device). In other embodiments, as discussed above, various configuration parameters may include a termination condition separate from (or in addition to) the event itself. In other embodiments configuration parameters are not utilized. At 312, once the event has concluded, the recorder outputs its recorded event data, which may entail (direct or indirect) transmission to the computing device or any other suitable device.

Figure 4:
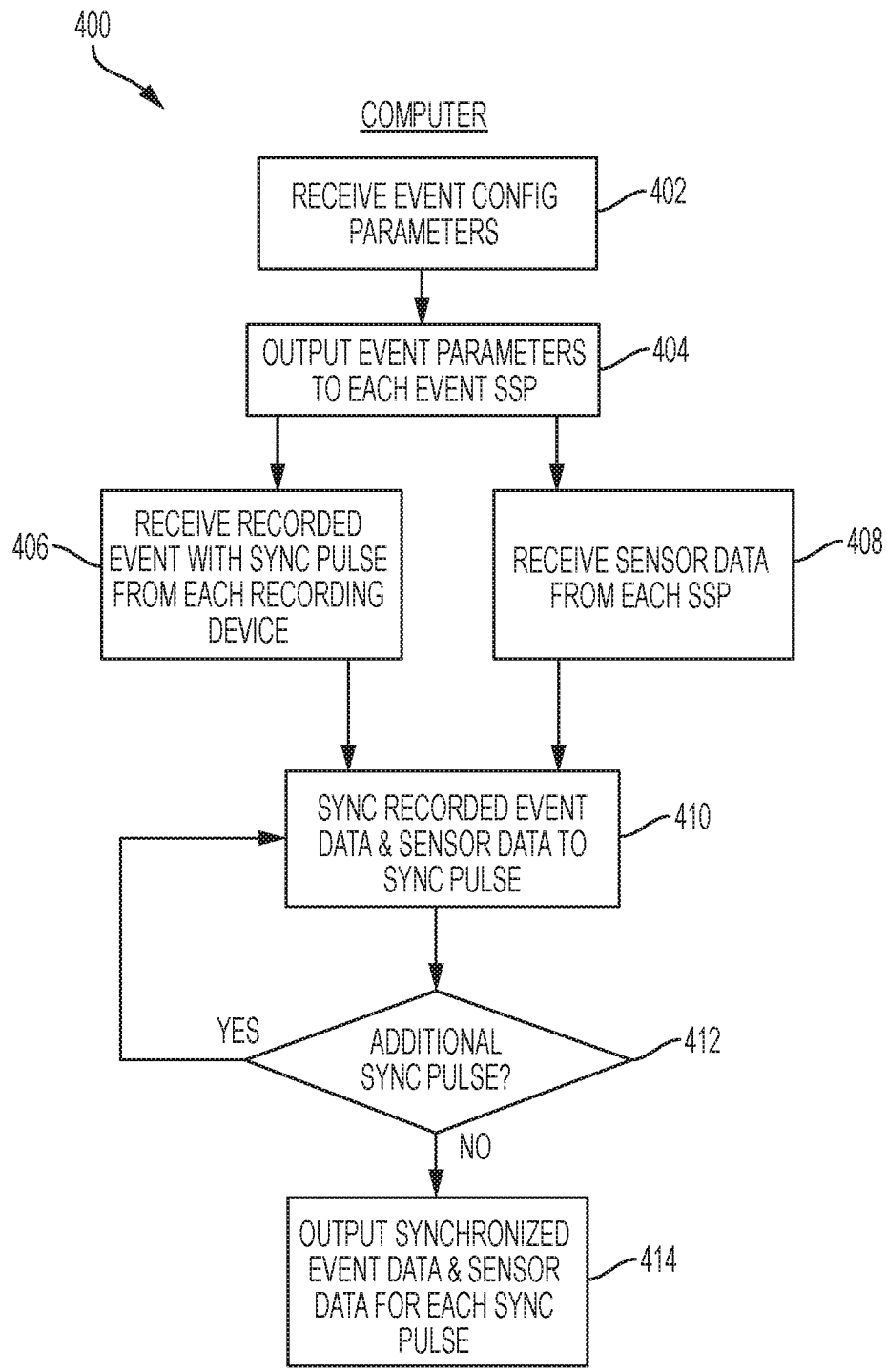
FIG. 4 is a flow chart depicting the operation of a computing device, according to one or more embodiments shown and described herein.

Turning now to FIG. 4, a flowchart 400 of the operation of a computing device is shown according to various embodiments. At 402, a computing device receives event configuration parameters. Event configuration parameters may be received as inputs, for example, through an interface within the computing device or from another device, including but not limited to a recorder and/or a synchronizing sensor. In other embodiments configuration parameters are not utilized. At 404 the computing device outputs configuration parameters to synchronizing sensors. In other embodiments the computing device outputs configuration parameters to recorders and/or other devices, in addition to or instead of one or more synchronizing sensors. At 406 recorded event data, which may include one or more synchronizing signals, from recorders at the event is received during and/or after the event. Additionally at 408 sensor data is received from synchronizing sensors at the event. At 410, once the event has concluded, there may be receipt of the recorded event data and sensor data by the computing device, wherein each piece of recorded event data and/or sensor data may be received directly or through one or more intermediate devices and/or networks.

At 410 the received recorded event data and the received sensor data is synchronized according to a synchronizing signal. At 412, if there are additional synchronizing signals, the received recorded event data and the received sensor data is synchronized according to some or all of the synchronizing signals. In some embodiments, sensor data also contains the synchronizing signal emitted by the same synchronizing sensor and/or an indication (such as a time marker) within the sensor data representing the synchronizing signal. At 414, the synchronized recorded event data and/or sensor data is output. As discussed below, this can be output to a graphical interface for further processing, recorded for storage, and/or synchronized live or in substantially real-time, such as viewing an event from multiple angles with accompanying synchronized sensor data.

Figure 5:
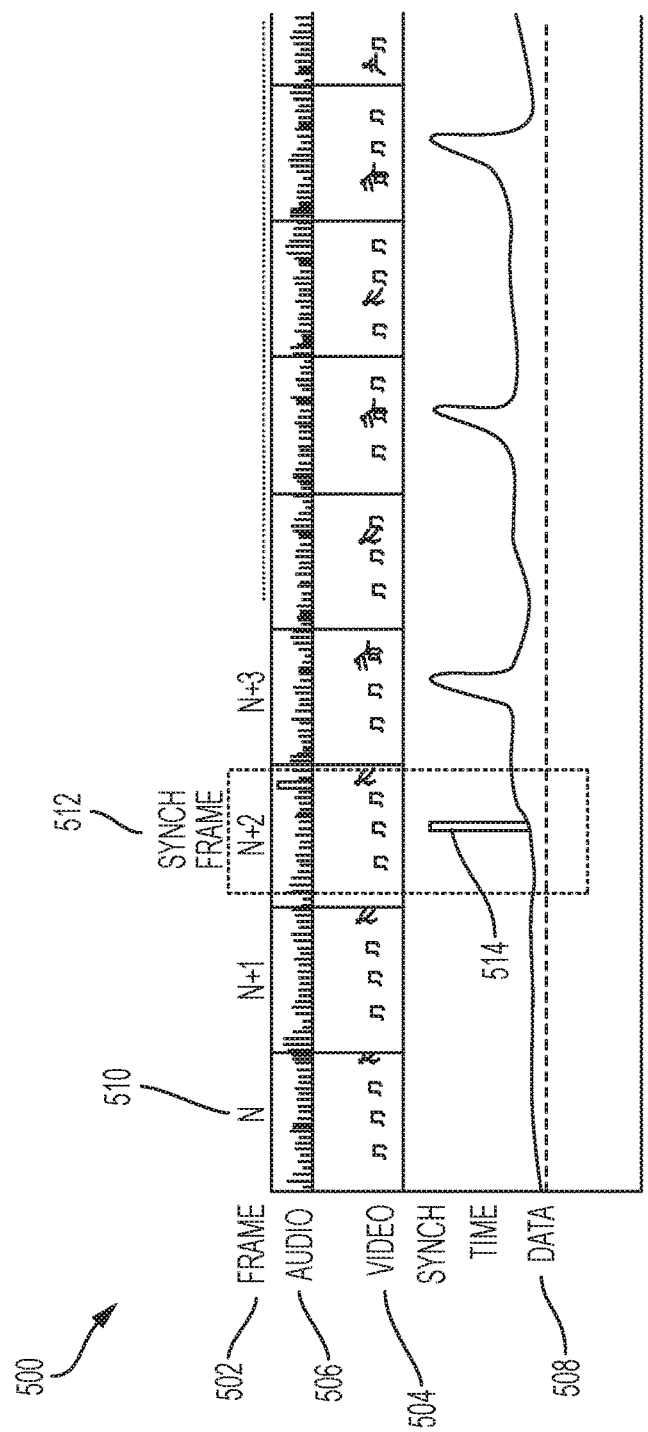
FIG. 5 schematically illustrates a graphical user interface for synchronizing different types of data, according to one or more embodiments shown and described herein.

Turning now to FIG. 5, a graphical user interface 500 is depicted, through which embodiments of the disclosure can be implemented. In this example, the interface displays recorded event data received as frames 502 of video data 504 and corresponding audio data 506. Additionally, sensor data 508 is displayed in a manner synchronized with the frames 502 of video data 504 and audio data 506. An index 510 of the frames 502 of the video data 504 may be utilized for synchronization, where one or more synchronizing frames 512 are mapped to one or more instances of a synchronizing signal 514 and the synchronizing signal 514 may be recorded by a recorder and/or a synchronizing sensor. In this example, the sensor data 508 is from an accelerometer, where spikes in the sensor data correspond to the indexed video frames 510 where the event participant is shown in the video data 504 jumping hurdles. Continuing with this example, the other indexed video frames 510 may be synchronized to other data, including sensor data 508, based upon the synchronizing frame 512. In some embodiments, synchronization with video data 504 may be based on any suitable increments, such as time intervals, and is not limited to frame-based synchronization. In other embodiments, multiple instances and types of video data 504, audio data 506, and sensor data 508 may be utilized and or displayed. In some embodiments the video data may not be indexed.

Figure 6:
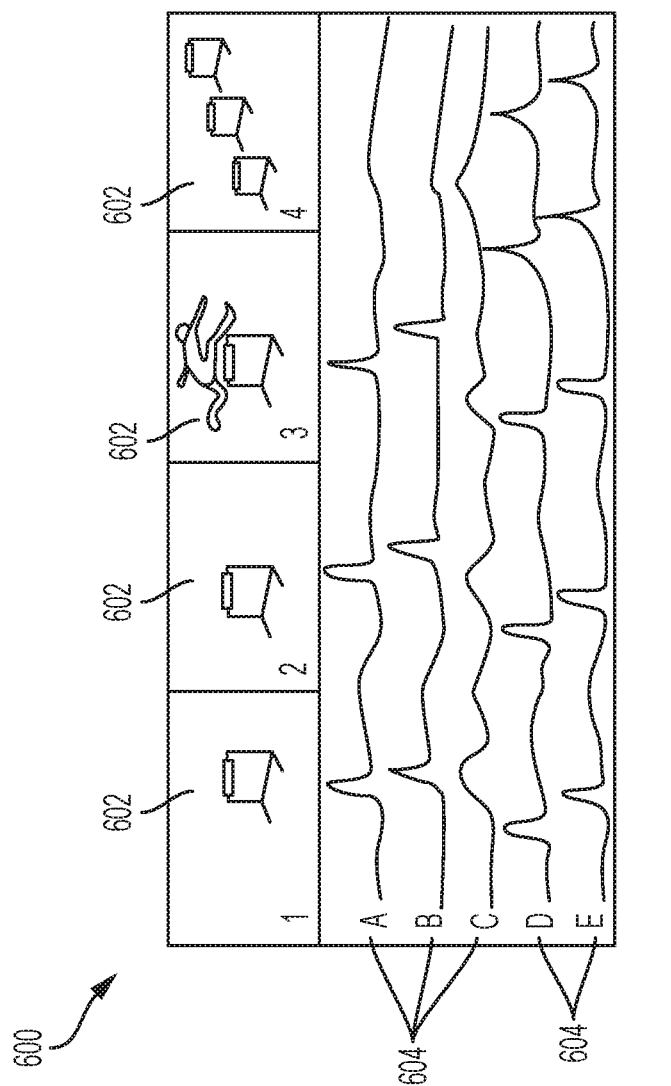
FIG. 6 schematically illustrates a graphical user interface with types of data synchronized, according to one or more embodiments shown and described herein.

Turning now to FIG. 6, a graphical user interface 600 is depicted, through which embodiments of the disclosure can be implemented. Multiple frames of video data 602 are shown depicting an event participant jumping hurdles while wearing five synchronizing sensors (not shown), such as accelerometers. Data streams A-E of sensor data 604, each corresponding to one of the synchronizing sensors worn by the event participant, are synchronized with the frames of video 602.

Turning now to FIG. 7, a block diagram illustrates an exemplary computing device 700, through which embodiments of the disclosure can be implemented. The computing device 700 described herein is but one example of a suitable computing device and does not suggest any limitation on the scope of any embodiments presented. The computing device 700 in some embodiments may also be utilized to implement a synchronizing sensor and/or a recorder. Nothing illustrated or described with respect to the computing device 700 should be interpreted as being required or as creating any type of dependency with respect to any element or plurality of elements. In various embodiments, a computing device 700 may include, but need not be limited to, a desktop, laptop, server, client, tablet, smartphone, or any other type of device that can compress data. In an embodiment, the computing device 700 includes at least one processor 702 and memory (non-volatile memory 708 and/or volatile memory 710). The computing device 700 can include one or more displays and/or output devices 704 such as monitors, speakers, headphones, projectors, wearable-displays, holographic displays, and/or printers, for example. Output devices 704 may further include, for example, audio speakers, devices that emit energy (radio, microwave, infrared, visible light, ultraviolet, x-ray and gamma ray), electronic output devices (Wi-Fi, radar, laser, etc.), audio (of any frequency), etc.

The computing device 700 may further include one or more input devices 706 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 706 may further include sensors, such as biometric (blood pressure, pulse, heart rate, perspiration, temperature, voice, facial-recognition, iris or other types of eye recognition, hand geometry, fingerprint, DNA, dental records, weight, or any other suitable type of biometric data, etc.), video/still images, motion data (accelerometer, GPS, magnetometer, gyroscope, etc.) and audio (including ultrasonic sound waves). Input devices 706 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like.

The computing device 700 typically includes non-volatile memory 708 (ROM, flash memory, etc.), volatile memory 710 (RAM, etc.), or a combination thereof. A network interface 712 can facilitate communications over a network 714 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 712 can be communicatively coupled to any device capable of transmitting and/or receiving data via the network 714. Accordingly, the network interface hardware 712 can include a communication transceiver for sending and/or receiving any wired or wireless communication. For example, the network interface hardware 712 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 716 may comprise a plurality of computer readable mediums, each of which may be either a computer readable storage medium or a computer readable signal medium. A computer readable storage medium 716 may reside, for example, within an input device 706, non-volatile memory 708, volatile memory 710, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 700 may include one or more network interfaces 712 to facilitate communication with one or more remote devices, which may include, for example, client and/or server devices. A network interface 712 may also be described as a communications module, as these terms may be used interchangeably.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising: a synchronizing sensor comprising: a sensing component configured to record sensor data detected from an event; and an output component configured to output: the sensor data from the event; and a periodic synchronizing signal according to a specified time parameter, a specified frequency parameter, and a duration parameter; a recorder configured to: generate recorded event data comprising the periodic synchronizing signal and first additional data recorded from the event; and output the recorded event data; and a computing device comprising: a processor and memory coupled to the processor; and instructions residing in the memory that upon execution cause the processor to: receive the sensor data from the event and the recorded event data; and synchronize, according to the periodic synchronizing signal, the recorded event data and the sensor data from the event.

2. The system of claim 1 wherein the sensing component of the synchronizing sensor is further configured to:
simultaneously record a plurality of data types; and
upon completion of the simultaneous recording of the plurality of data types, simultaneously output the plurality of data types.

3. The system of claim 1 further comprising:
an additional synchronizing sensor comprising:
an additional sensing component configured to record additional sensor data detected from the event; and
an additional output component configured to output the additional sensor data from the event recorded by the additional sensing component; and
the computing device comprising further instructions residing in the memory that upon execution cause the processor to:
receive the additional sensor data from the event; and
synchronize, according to the periodic synchronizing signal, the additional sensor data, the recorded event data, and the sensor data from the event.

4. The system of claim 3 wherein the additional synchronizing sensor is configured to record and output the additional sensor data from the event as a data type that differs from the sensor data from the event.

5. The system of claim 1 further comprising:
an additional synchronizing sensor comprising an output component configured to output an additional periodic synchronizing signal; and
the computing device comprising further instructions residing in the memory that upon execution cause the processor to:
receive the additional periodic synchronizing signal; and
synchronize, according to the additional periodic synchronizing signal, the recorded event data and the sensor data from the event.

6. The system of claim 1 further comprising:
an additional recorder configured to:
generate additional recorded event data comprising the periodic synchronizing signal and second additional data recorded from the event, wherein the second additional data differs from the first additional data; and
output the additional recorded event data; and
the computing device comprising further instructions residing in the memory that upon execution cause the processor to:
receive the additional recorded event data; and
synchronize, according to the periodic synchronizing signal, the additional recorded event data, the recorded event data, and the sensor data from the event.

7. The system of claim 1, wherein the synchronizing sensor further comprises an activation component configured to activate the synchronizing sensor upon receipt of an activation input.

8. A method comprising: recording, through a synchronizing sensor, sensor data detected from an event; outputting, from the synchronizing sensor, the sensor data from the event and a periodic synchronizing signal, wherein the periodic synchronizing signal is output according to a specified time parameter, a specified frequency parameter, and a duration parameter; generating, from a recorder, recorded event data comprising the periodic synchronizing signal and first additional data recorded from the event; outputting the recorded event data from the recorder; receiving, at a computing device, the sensor data from the event and the recorded event data; and synchronizing according to the periodic synchronizing signal, at the computing device, the recorded event data and the sensor data from the event.

9. The method of claim 8 further comprising:
simultaneously recording, through the synchronizing sensor, a plurality of data types; and
upon completion of the simultaneous recording of the plurality of data types, simultaneously outputting the plurality of data types from the synchronizing sensor.

10. The method of claim 8 further comprising:
recording, through an additional synchronizing sensor, additional sensor data detected from the event; and
outputting, from the additional synchronizing sensor, the additional sensor data from the event recorded by the additional synchronizing sensor;
receiving, at the computing device, the additional sensor data from the event; and
synchronizing, at the computing device, according to the periodic synchronizing signal: the additional sensor data, the recorded event data, and the sensor data from the event.

11. The method of claim 10 further comprising recording and outputting, through the additional synchronizing sensor, the additional sensor data from the event as a data type that differs from the sensor data from the event.

12. The method of claim 8 further comprising:
outputting, from an additional synchronizing sensor, an additional periodic synchronizing signal;
receiving, at the computing device, the additional periodic synchronizing signal; and
synchronizing, at the computing device, the recorded event data and the sensor data from the event, according to the additional periodic synchronizing signal.

13. The method of claim 8 further comprising:
generating, at an additional recorder, additional recorded event data comprising the periodic synchronizing signal and second additional data recorded from the event, wherein the second additional data differs from the first additional data; and
outputting, from the additional recorder, the additional recorded event data;
receiving, at the computing device, the additional recorded event data; and
synchronizing, at the computing device, according to the periodic synchronizing signal: the additional recorded event data, the recorded event data, and the sensor data from the event.

14. A non-transitory computer readable medium embodying computer-executable instructions, that when executed by a processor, cause the processor to execute operations comprising: recording, through a synchronizing sensor, sensor data detected from an event; outputting, from the synchronizing sensor, the sensor data from the event and a periodic synchronizing signal, wherein the periodic synchronizing signal is output according to a specified time parameter, a specified frequency parameter, and a duration parameter; generating, from a recorder, recorded event data comprising the periodic synchronizing signal and first additional data recorded from the event; outputting the recorded event data from the recorder; receiving, at a computing device, the sensor data from the event and the recorded event data; and synchronizing according to the periodic synchronizing signal, at the computing device, the recorded event data and the sensor data from the event.

15. The non-transitory computer readable medium of claim 14 embodying further computer-executable instructions that comprise:
receiving a user-specified recording rate; and
recording, through the synchronizing sensor, the sensor data according to the user-specified rate.

16. The non-transitory computer readable medium of claim 14 embodying further computer-executable instructions that comprise:
simultaneously recording, through the synchronizing sensor, a plurality of data types; and
upon completion of the simultaneous recording of the plurality of data types, simultaneously outputting the plurality of data types from the synchronizing sensor.

17. The non-transitory computer readable medium of claim 14 embodying further computer-executable instructions that comprise:
recording, through an additional synchronizing sensor, additional sensor data detected from the event; and
outputting, from the additional synchronizing sensor, the additional sensor data from the event recorded by the additional synchronizing sensor;
receiving, at the computing device, the additional sensor data from the event; and
synchronizing, at the computing device, according to the periodic synchronizing signal: the additional sensor data, the recorded event data, and the sensor data from the event.

18. The non-transitory computer readable medium of claim 17 embodying further computer-executable instructions that comprise recording and outputting, through the additional synchronizing sensor, the additional sensor data from the event as a data type that differs from the sensor data from the event.

19. The non-transitory computer readable medium of claim 14 embodying further computer-executable instructions that comprise:
outputting, from an additional synchronizing sensor, an additional periodic synchronizing signal;
receiving, at the computing device, the additional periodic synchronizing signal; and
synchronizing, at the computing device, the recorded event data and the sensor data from the event, according to the additional periodic synchronizing signal.

* * * * *